May 8, 1956 J. D. LLOPES 2,744,971

HIGH FIDELITY AUDIO FREQUENCY AMPLIFIER

Filed July 12, 1951

INVENTOR.
John D. Llopes
BY
Harry Langsam
Attorney

United States Patent Office 2,744,971

Patented May 8, 1956

2,744,971

HIGH FIDELITY AUDIO FREQUENCY AMPLIFIER

John D. Llopes, Philadelphia, Pa.

Application July 12, 1951, Serial No. 236,383

1 Claim. (Cl. 179—171)

My invention relates to an audio frequency amplifier and relates particularly to a high fidelity amplifier employing two tubes of standard construction.

It is to be noted that the ear responds to frequencies of sound which vary from 40 to 10,000 cycles per second, and the aforementioned sound frequencies can only be heard by people with exceptionally good hearing faculties.

Heretofore, high fidelity amplifiers have utilized approximately eight tubes and they usually require a matching output transformer, which is a relatively expensive item. The entire high fidelity circuit is relatively costly since it requires eight tubes, a matching transformer, and complementary parts such as sockets, wire, condensers, and resistors.

The high fidelity amplifier not only is costly, but it is bulky and heavy in weight, hence it is utilized only in expensive types of radios, television receivers, and record players.

It, therefore, is an object of my invention to provide a small amplifier which can be manufactured at a very low cost and which reproduces high fidelity audio frequency signals.

Another object of my invention is to provide an audio frequency amplifier which can faithfully amplify from 30 to 10,000 cycles per second.

Another object of my invention is to provide a two tube high-fidelity audio frequency amplifier which uses inexpensive standard parts which are readily obtainable.

Another object of my invention is to provide a feedback circuit wherein a fraction of the input signal is fed back out-of-phase to the input in order to effect faithful signal reproduction.

Another object of my invention is to amplify certain frequencies in greater proportion than other frequencies for high fidelity sound reproduction.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Figure 1:
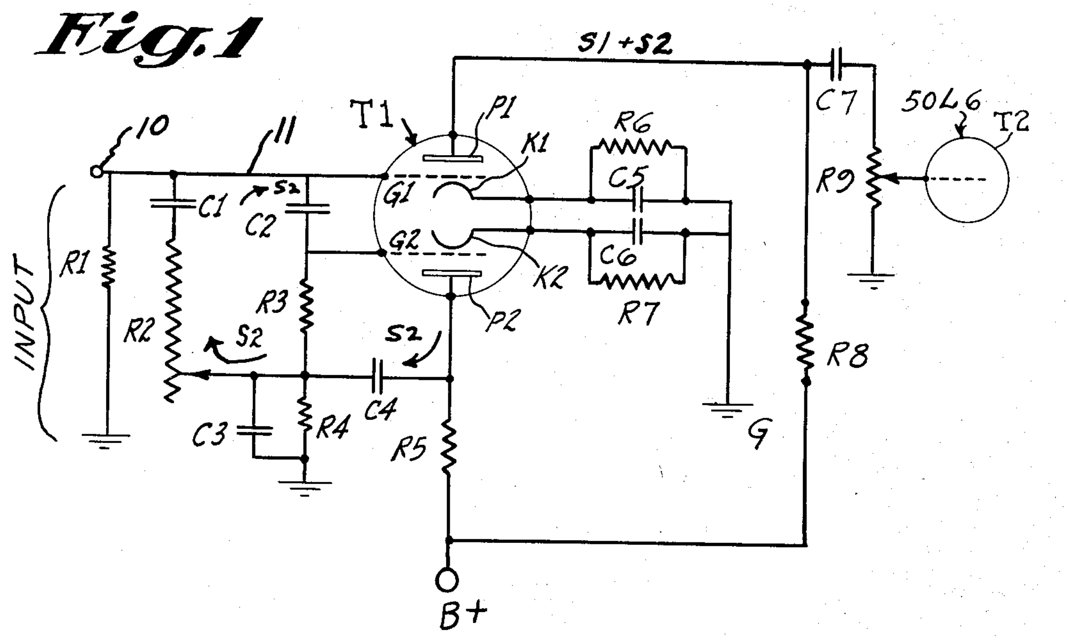
Fig. 1 is a schematic view of a high fidelity audio frequency amplifier utilizing my invention.

Referring now in greater detail to the drawing wherein similar reference characters refer to similar parts I show a high fidelity amplifier circuit embodying my invention wherein an amplifier tube, generally designated as T1, preferably a twin triode of the 12SL7 type, receives and amplifies an audio signal; a portion of the signal is fed back and re-amplified in one of the twin triodes and then the signal is fed to a second amplifier tube, generally designated at T2, which preferably is a 50L6 tube.

The circuit of my invention embodies an input terminal 10 and a ground G upon which the input signal is impressed. The signal is carried to the grid G1 of the first triode section of the tube T1 through a conductor 11. The amplified signal from the first triode, designated as S1, is carried from the plate P1 to an isolating condenser C7 which is connected to the grid of the second amplifier tube T2. Part of the incoming signal is carried from the conductor 11 through the condenser C2, to the second grid G2 of the tube T1 where the signal is amplified in the second triode. The impedance of the condenser C2 is of a value which will pass the higher frequencies rather than the lower frequencies. The amplified signal is fed through the plate P2, a condenser C4, a variable rheostat R2, and a condenser C1 to the conductor 11 where the signal is further amplified through the first triode. The reamplified signal is 180° out-of-phase with the input signal; and the signal S2 is designated as the second signal which comes through the second triode.

A fixed resistor R1 is connected across the input terminals 10 and G. The terminal 10 is connected to one end of a fixed condenser C1, and the other end of the condenser is connected to one end of a variable resistor R2. The resistor R2 serves as a tone control to control the bass notes. The other end of the variable resistor R2 is joined to the junction of a fixed resistor R3, a fixed resistor R4, and a condenser C3. The fixed resistor R3 has its other end connected to the second grid G2 of the twin triode T1. The resistor R4 and the condenser C3 are joined in parallel with one end being grounded. The fixed resistor R4 serves as a grid bias for the second grid G2.

In other words a portion of the incoming signal reaches the second grid G2 through the line 11 and the condenser C2. The condenser C2 joins the twin triode grids G1 and G2 passing a portion of the signal from the line 11 to the second grid G2. The plate P2 is connected to one end of the by-pass condenser C4 and the other end of the condenser C4 is connected to the junction of the variable resistor R2, the fixed resistors R3, R4, and the grounded condenser C3.

The cathode K1 of the first triode is connected to the ground G by a parallel joined condenser C5 and resistor R6; and the cathode K2 of the second triode of tube T1 is connected to the ground G through a parallel joined condenser C6 and resistor R7. One end of each of the condensers C5, C6, the resistors R6, R7 is grounded.

Figure 2:
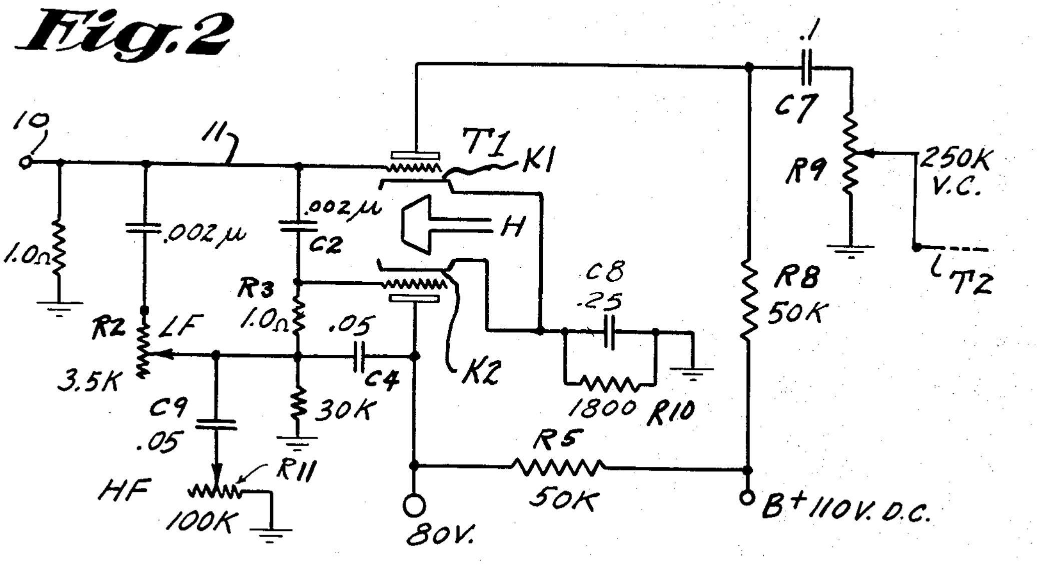
Fig. 2 is a schematic view of a modification of my invention.
Figure 3:
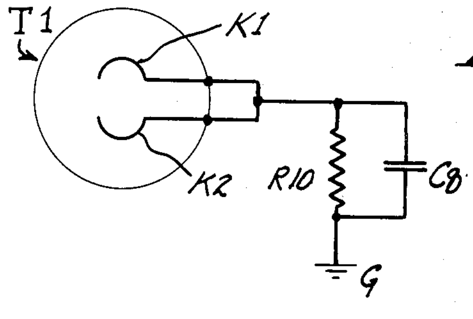
Fig. 3 is a view showing a modification of the cathode connections for the twin triode tube.

In Fig. 3 I show the cathodes K1 and K2 joined to one end of a resistor R10 and a condenser C8, the resistor R10 and the condenser C8 have their other end grounded; hence, the resistor R10 and the condenser C8 are in parallel. The circuit shown in Fig. 3 serves as an automatic bias control and the element C8, shown in Figs. 2 and 3, does not function as a by-pass condenser.

The cathode K1 bias in Fig. 1 is condenser C5 and resistor R6; and the cathode K2 bias is condenser C6 and resistor R7, and in Fig. 2 the cathode bias for both K1 and K2 is condenser C8 and resistor R10. The circuit illustrated in Fig. 1 has a tendency to overload whereas the circuit shown in Fig. 3 will not overload and serves as an automatic control.

The resistor R5 is a voltage dropping resistor joined to the B+ terminal and the plate P2; and the resistor R8 joined to the B+ terminal and the plate P1.

The grid bias for the grid G2 of the circuit shown in Fig. 1 is the combination of the condenser C3 and the resistor R4.

The high fidelity signals (a combination of S1 plus S2) may be produced because the high frequencies of the incoming signal pass through the condenser C2 to the grid G2 where the second triode amplifies the high frequencies about 10 times; the lower frequencies being amplified through the first triode. A part of the amplified signal through the second grid is carried back through the plate P2, the condenser C4, the resistance R2, the condenser C1 and through the grid G1 to the grids and reamplified.

The circuit shown in Fig. 1 is a feed-back, the waveform at the output of the amplifier T1 is a faithful reproduction of the input signal applied across the input terminal 10 and ground 6.

When a fraction of the input is amplified and fed back out-of-phase with the input, the distortion component of the voltage is amplified by the same factor as the input signal. As a result the net output may contain practically no distortion but the amplitude of the desired signal is increased.

Noise introduced within the twin triode also is reduced by my circuit.

In Fig. 2 I show a modification of my invention wherein the grid bias condenser C9 having a value of 0.05 microfarads is connected to a variable resistor R11 which is grounded, thereby serving as a high frequency tone control for controlling the low frequencies while the variable resistor R2 serves as low frequency tone control for controlling the bass.

The values shown in Fig. 2 are in ohms for resistors and microfarads for condensers.

| Ohms: | Microfarads: |
|---|---|
| R1, 1 megohm | C1, .002 $\mu$f. |
| R2, 3,500 | C2, .002 $\mu$f. |
| R3, 1 megohm | C3, .05 |
| R4, 30,000 | C4, .05 |
| R5, 50,000 | C5, .25 |
| R6, 1,800 | C6, .25 |
| R7, 1,800 | C7, 0.1 |
| R8, 50,000 | C8, .25 |
| R9, 250,000 | C9, .05 |
| R10, 1,800 | |
| R14, 100,000 | |

Since the elements of this particular invention comprise a tube, resistor and capacitors of standard and commercial construction the amplifier may be constructed at low cost to reproduce faithfully audio frequencies of 30 to 10,000 cycles per second.

A review of the operation of my invention is as follows:

A signal S is introduced across resistor R1, the signal S is divided a portion being amplified through the first triode and the higher frequencies being amplified through the second triode. The amplified signal from the second triode is fed back 180° out-of-phase to the first triode where the original signal is amplified and the higher frequencies are amplified 180° out-of-phase but at a higher rate of amplification than other frequencies of the original input signal.

Since the ear does not respond to all sound frequencies in equal proportion it is apparent that the high frequencies which have been greatly amplified through my amplifier can be readily heard by the ear. The second amplifier T2 provide the necessary volume to the amplified signal.

The impedance offered to the signal is approximately in the ratio of 10 to 1; that is to say presuming the original input signal to be 10 then 90% of it is impressed on grid G1 and 10% of it is imprressed on grid G2. Hence, the first triode amplifies 90% of the original input signal and the second triode amplifies 10% of the original signal. The first triode subsequently receives the reamplified 10% of the original signal which is now more greatly amplified than the original 10% of the signal.

Although my invention has been described in considerable detail, such descripton is intended as being illustrative rather than limiting, since the invention may be variously embodied, and the scope of the invention is to be determined as claimed.

I claim as my invention:

A high fidelity amplifier comprising a pair of triodes, each triode having a cathode, grid and plate, one triode being adapted to amplify lower audio frequency components of an applied input signal, the second triode being used to amplify the higher audio frequency components of said applied input signal, a feedback circuit to feed back amplified signals from said second triode to said first triode 180° out of phase with said applied input signal, said feedback circuit including a plurality of condensers and a resistor in series, one end of said feedback circuit being connected to the plate of said second triode and the other end of said feedback circuit being connected to the grid of said first triode, the grid of said second triode being connected to the grid of said first triode through one of said plurality of condensers, a voltage source being applied to the plate of each of said triodes through resistors, the plates of said triodes being joined together through a series of resistors, the cathodes of each triode being connected to ground through a resistor and condenser connected in parallel, the input signal being applied across a resistor connected directly at one end to the grid of said first triode, the other end of the last mentioned resistor being connected to ground, and an output signal being taken from the plate of said first triode and applied across a condenser and resistor in series to ground.

References Cited in the file of this patent

UNITED STATES PATENTS

| | | |
|---|---|---|
| 2,008,825 | Hammond | July 23, 1935 |
| 2,429,124 | Cunningham | Oct. 14, 1947 |

FOREIGN PATENTS

| | | |
|---|---|---|
| 598,287 | Great Britain | Feb. 16, 1948 |

OTHER REFERENCES

"Radio Engineering," Terman, 3d ed. (pp. 320–329), pub. 1947 by McGraw-Hill Book Co., N. Y.